United States Patent
Hammer et al.

(10) Patent No.: US 9,836,632 B1
(45) Date of Patent: Dec. 5, 2017

(54) BARCODE SCANNER ILLUMINATION

(71) Applicant: NCR Corporation, Duluth, GA (US)

(72) Inventors: Steven Joel Hammer, Lilburn, GA (US); John Paul Bacalso Aliganga, Cebu (PH)

(73) Assignee: NCR Corporation, Duluth, GA (US)

( * ) Notice: Subject to any disclaimer, the term of this patent is extended or adjusted under 35 U.S.C. 154(b) by 11 days.

(21) Appl. No.: 15/223,650

(22) Filed: Jul. 29, 2016

(51) Int. Cl.
G06F 7/10 (2006.01)
G06K 7/10 (2006.01)
G06K 19/06 (2006.01)

(52) U.S. Cl.
CPC ..... G06K 7/10742 (2013.01); G06K 7/10831 (2013.01); G06K 19/06028 (2013.01)

(58) Field of Classification Search
CPC ........ G07F 7/08; G06Q 20/342; G06Q 30/06; G06Q 20/20; G06K 17/00; G06K 7/10693; G06K 7/10732; G06K 7/10722

USPC ............ 235/462.42, 462.13, 383, 381, 462.2
See application file for complete search history.

(56) References Cited

U.S. PATENT DOCUMENTS

| 8,356,749 B2* | 1/2013 | Olmstead | G01G 3/08 235/383 |
| 8,552,313 B2* | 10/2013 | Atwater | G01G 19/4144 177/245 |
| 8,870,073 B2* | 10/2014 | Detwiler | G07G 1/0045 235/383 |

* cited by examiner

*Primary Examiner* — Karl D Frech
(74) *Attorney, Agent, or Firm* — Schwegman, Lundberg & Woessner

(57) ABSTRACT

Disclosed is a barcode scanner. The barcode scanner can include a top plate and a first illumination source. The top plate can include a surface. The surface can define a scanning window and a first edge of the top plate. The first illumination source can be located proximate the first edge of the top plate. The first illumination source can be arranged to direct light in a direction of the scanning window. The light can have a strobe sequence.

13 Claims, 5 Drawing Sheets

BARCODE SCANNER ILLUMINATION

BACKGROUND

Service terminals have become ubiquitous within the retail environment. At the retail level, service terminals can include self-service terminals (SST) and cashier service terminals. Service terminals allow customers to quickly checkout by allowing the customer or a cashier to scan items having a barcode. The items are scanned by moving items quickly over a scanner.

SUMMARY

Disclosed is a barcode scanner. The barcode scanner can include a top plate and a first illumination source. The top plate can include a surface. The surface can define a scanning window and a first edge of the top plate. The first illumination source can be located proximate the first edge of the top plate. The first illumination source can be arranged to direct light in a direction of the scanning window. The light can have a strobe sequence.

BRIEF DESCRIPTION OF THE FIGURES

The above-mentioned and other features and advantages disclosed herein, and the manner of attaining them, will become more apparent and the disclosure itself will be better understood by reference to the following description of embodiments taken in conjunction with the accompanying drawings, wherein.

Corresponding reference characters indicate corresponding parts throughout the several views. The exemplifications set out herein illustrate embodiments, and such examples are not to be construed as limiting the scope of the appended claims any manner.

DETAILED DESCRIPTION

Figure 1:
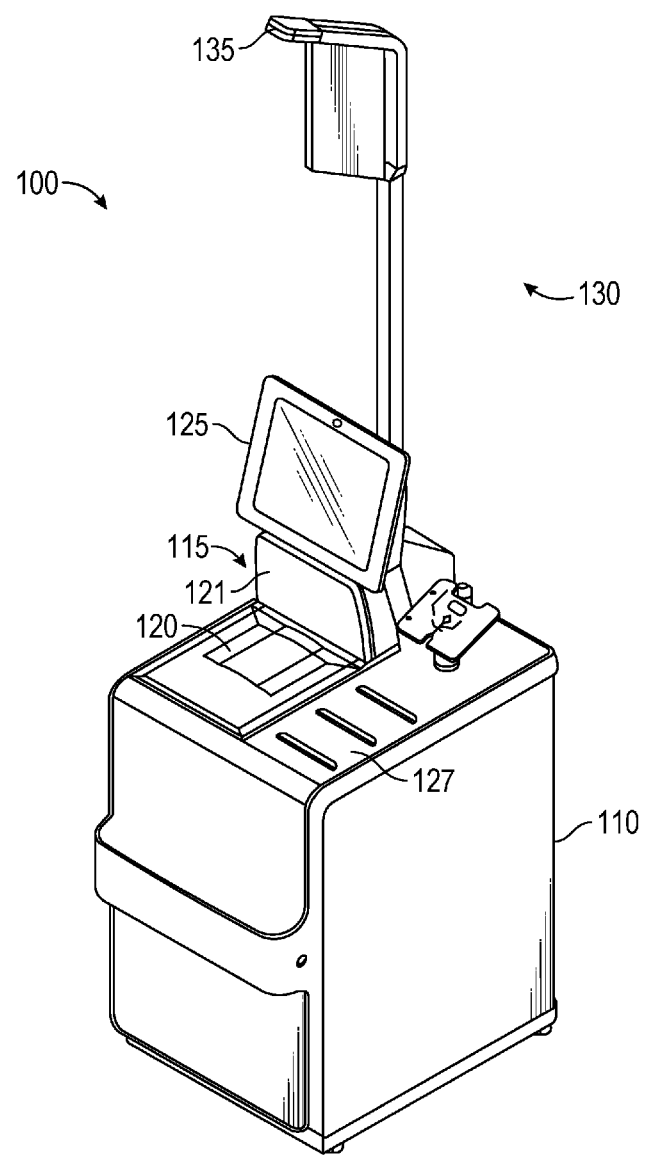
FIG. 1 shows a perspective view of a service terminal according to an example embodiment.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Barcode scanners can be image scanners. During use, a light source within the barcode scanner can produce a strobed light. The strobed light can cause a barcode to appear motionless as the barcode passes in front of a camera or other optical sensor.

To avoid having a strobe light flashing at a user and possibly causing fatigue, light sources can be located such that the light emitted by the light sources can be directed into an area the barcode will pass and away from the user. As disclosed herein, one or more light sources can be used to direct light into a proper position. For example, light sources can be located along an edge of a top plate. Light sources can also be directed at corners of a top plate. These and other embodiments are described in greater detail herein with reference to the figures.

Turning not to the figures, FIG. 1 is a block perspective diagram of a service terminal 100 that includes a housing 110 supporting a barcode scanner indicated generally at 115. Housing 110 may have a rack like structure and may contain circuitry to provide power, processing, card reading, and other functions. In various embodiments, the barcode scanner 115 may include a first scanning window 120 and a second scanning window 121, and a display 125, which may be a touchscreen display that may accept user input. The first scanning window 120, as shown, may be parallel to a working surface 127 of housing 110 and may to facilitate scanning of products to be purchased. Working surface 127 may also be referred to as a top surface. The barcode scanner 115 may also include a card reader that may be used to complete transactions. A marker device 130 may be used to provide indicators to customers, such as via a light 135 having a color representative of a status of a lane that the service terminal 100 is servicing.

The service terminal 100 may be used in an assisted mode where a cashier scans the customer's products and performs other checkout functions. Generally, cashiers may swipe an item over the barcode scanner 115 and a barcode on the item can be read via a scanner located under the first scanning window 120 or behind the second scanning window 121. As described herein, as the item is being swiped over the barcode scanner 115, the area proximate the first scanning window 120 and the second scanning window 121 can be illuminated.

The illumination can be in the form of a strobe sequence. For example, the strobe sequence can include lights that flash in the range of about 60 Hz to about 250 Hz. For instance, the illumination can be caused by light emitting diodes (LEDs) flashing at 80 Hz. The strobe sequence can cause the barcode on the item to appear motionless to the barcode scanner 115 even while the item is in motion.

Figure 2A:
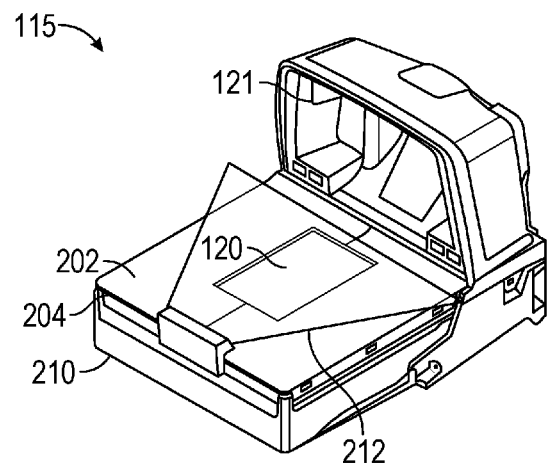
FIGS. 2A and 2B show a barcode scanner according to an example embodiment.
Figure 2B:
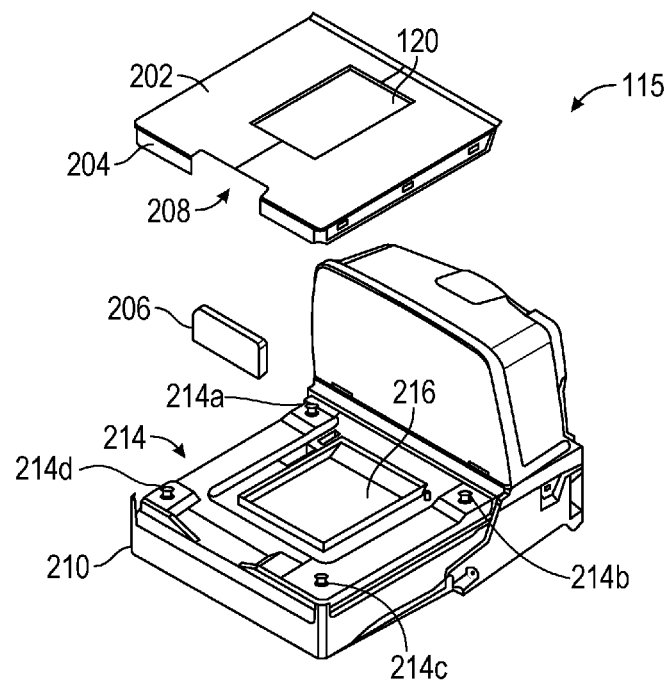

Turning now to FIGS. 2A and 2B, FIGS. 2A and 2B show the barcode scanner 115. The barcode scanner 115 can include the first scanning window 120 and the second scanning window 121. In addition, the barcode scanner 115 can include a top plate 202 that defines the first scanning window 120 and a first edge 204.

The barcode scanner 115 can also include an illumination source 206. The illumination source 206 can be located proximate the first edge 204 of the top plate 202. As shown in FIG. 2B, the top plate 202 can include a notch 208 in which the illumination source 206 can be located. The notch 208 can allow the illumination source 206 to be mounted to a base 210. As a result, the top plate 202 can move freely relative to the illumination source 206.

The illumination source 206 can be mounted to the top plate 202. As a result, when the top plate 202 moves the illumination source 206 can move with it.

As shown in FIG. 2A, the illumination source 206 can direct light 212 in the direction of the first scanning window 120 and the second scanning window 121. The illumination source 206 can include LEDs or other light sources. The light sources can be strobe lights that can cause a barcode on an item to appear stationary as the item passes over the scanner 115.

The top plate 202 can rest on a scale 214. The scale 214 can be used to weigh items. For example, the scale 214 can include four points 214a, 214b. 214c, and 214d that can support the top plate 202 and that can be used to weigh produce while a scanner 216 scans a barcode attached to the produce that identifies a price per pound for the produce.

Figure 3A:
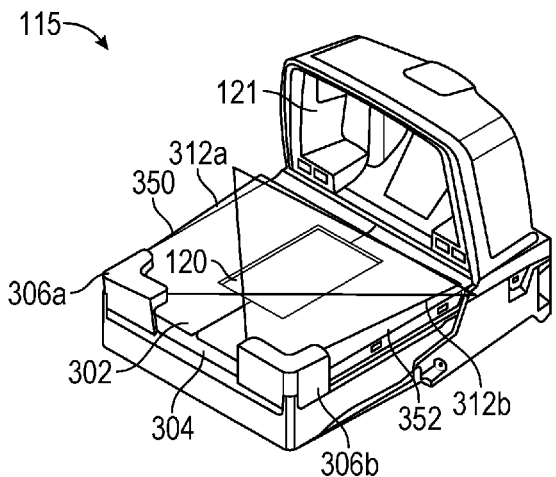
FIGS. 3A and 3B show a barcode scanner according to an example embodiment.
Figure 3B:
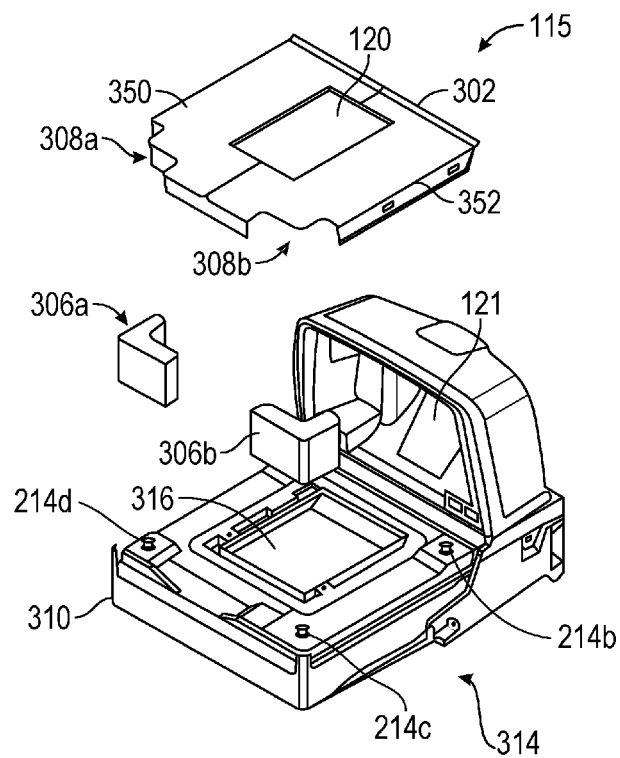

FIGS. 3A and 3B show the barcode scanner 115. The barcode scanner 115 can include the first scanning window 120 and the second scanning window 121. In addition, the barcode scanner 115 can include a top plate 302 that defines the first scanning window 120 and a first edge 304, a second edge 350 and a third edge 352.

The barcode scanner 115 can also include a first illumination source 306a and a second illumination source 306b. As shown in FIG. 3B, the top plate 302 can include a first notch 308a and a second notch 308b. The first illumination source 306a can be located proximate an intersection of the first edge 304 and the second edge 350 and the second illumination source 306b can be located proximate an intersection of the first edge 304 and the third edge 352. Stated another way, the first illumination source 306a and the second illumination source 306b can be locate where the first edge 304 would intersect the second edge 350 and the third edge 352 if the first notch 308a and the second notch 308b were not present.

The first notch 308a and the second notch 308b can allow the first illumination source 306a and the second illumination source 306b to be mounted to a base 310. As a result, the top plate 302 can move freely relative to the first illumination source 306a and the second illumination source 306b. In addition, the first illumination source 306a and the second illumination source 306b can be mounted to the top plate 302. As a result, when the top plate 302 moves the first illumination source 306a and the second illumination source 306b can move with it.

As shown in FIG. 3A, the first illumination source 306a and the second illumination source 306b each can direct light 312a and 312b in the direction of the first scanning window 120 and the second scanning window 121. The first illumination source 306a and the second illumination source 306b can include LEDs or other light sources. The light sources can be strobe lights that can cause a barcode on an item to appear stationary as the item passes over the scanner 115.

The top plate 302 can rest on a scale 314. The scale 314 can be used to weigh items. For example, the scale 314 can be used to weigh produce while a scanner 316 scans a barcode attached to the produce that identifies a price per pound for the produce.

Figure 4A:
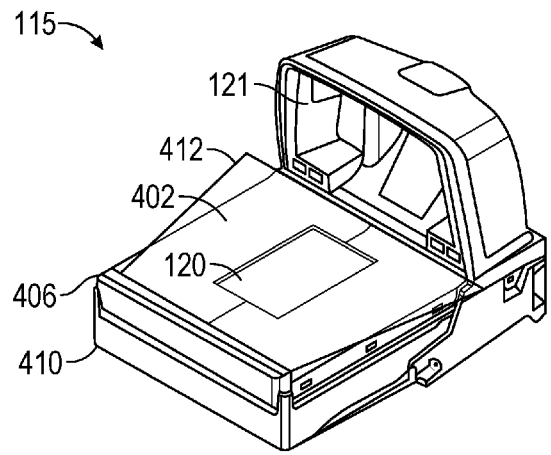
FIGS. 4A and 4B show a barcode scanner according to an example embodiment.
Figure 4B:
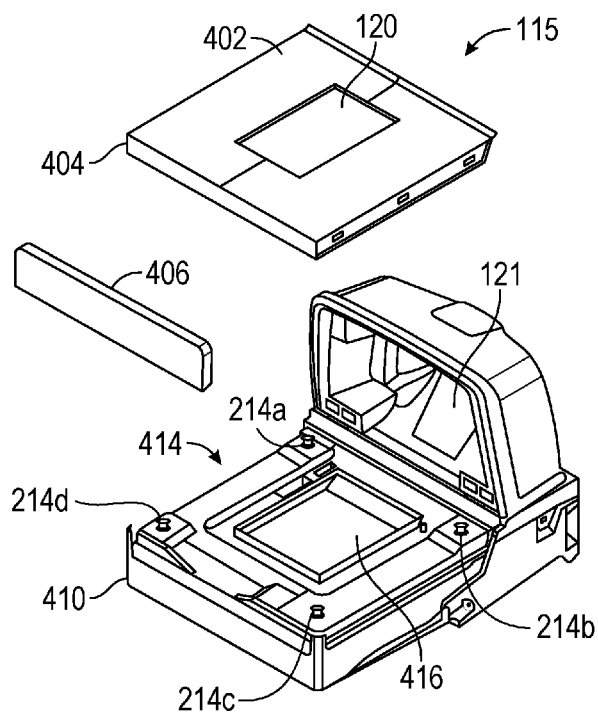

FIGS. 4A and 4B show the barcode scanner 115. The barcode scanner 115 can include the first scanning window 120 and the second scanning window 121. In addition, the barcode scanner 115 can include a top plate 402 that defines the first scanning window 120 and a first edge 404.

The barcode scanner 115 can also include an illumination source 406. The illumination source 406 can be located proximate the first edge 404. The illumination source 406 can be mounted to a base 410. As a result, the top plate 402 can move freely relative to the illumination source 406. In addition, the illumination source 406 can be mounted to the top plate 402. As a result, when the top plate 402 moves the illumination source 406 can move with it.

As shown in FIG. 4A, the illumination source 406 each can direct light 412 in the direction of the first scanning window 120 and the second scanning window 121. The illumination source 406 can include LEDs or other light sources. The light sources can be strobe lights that can cause a barcode on an item to appear stationary as the item passes over the scanner 115.

The top plate 402 can rest on a scale 414. The scale 414 can be used to weigh items. For example, the scale 414 can be used to weigh produce while a scanner 416 scans a barcode attached to the produce that identifies a price per pound for the produce.

Figure 5A:
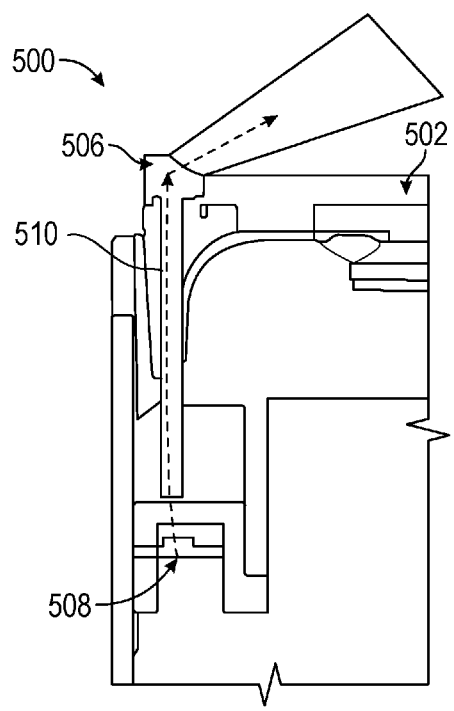
FIGS. 5A and 5B show a barcode scanner according to an example embodiment.
Figure 5B:
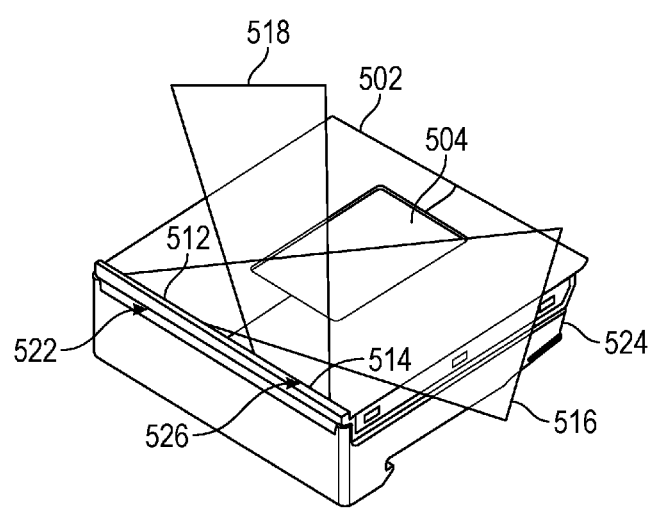

FIGS. 5A and 5B show a schematic of a barcode scanner 500 according to an example embodiment. The barcode scanner 500 can be used in the service terminal 100 as described herein. The barcode scanner 500 can include top plate 502 that can define a scanning window 504. The barcode scanner 500 can also include a housing 506 optically coupled to a LED board 508 via a conduit 510. The LED board 508 can include one or more LEDs. The light generated by the LED board 508 can pass through the conduit 510 and be directed towards the scanning window 504 via one or more lens 512 and 514 as shown by reference numerals 516 and 518, respectively. As shown in FIG. 5B, one of the lens 512 can be located at a leading edge 520 and the other lens 514 can be located at a trailing edge 522 of the top plate 502.

While FIGS. 5A and 5B show the lens 512 and 514 located on one side of the top plate 502, the lens 512 and 514 can be located at other edges of the top plate 502. In addition, the lens 512 and 514 can be secured to the top plate 502 or to a base 524 as described above.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A barcode scanner comprising:
   a top plate having a surface, the surface defining a scanning window and a first edge of the top plate, the first edge of the top plate defining a notch proximate a center of the first edge;
   a scanner located adjacent to the scanning window and beneath the top plate; and
   a first illumination source extending above the surface and located within the notch defined by the first edge of the top plate, the first illumination source arranged to direct light in a direction parallel to and above the scanning window and perpendicular to the scanner, the light having a strobe sequence.

2. The barcode scanner of claim 1, further comprising a second illumination source, wherein the surface further defines a second edge that intersects the first edge, the second illumination source located at an intersection of the first edge and the second edge.

3. The barcode scanner of claim 1, wherein the notch is defined opposite a second scanning window such that the first illumination source is located opposite the second scanning window and directs light towards the second scanning window.

4. The barcode scanner of claim 1, wherein the top plate is configured to move independent of the first illumination source.

5. The barcode scanner of claim 1, wherein the first illumination source is secured to the top plate.

6. The barcode scanner of claim 1, wherein the strobe sequence ranges from about 60 Hz to about 250 Hz.

7. The barcode scanner of claim 1, wherein the first illumination source includes a plurality of light emitting diodes.

8. A barcode scanner comprising:
- a top plate having a surface, the surface defining a scanning window and a first edge of the top plate, the first edge of the top plate defining a notch proximate a center of the first edge;
- a scanner located beneath the scanning window;
- an illumination source located beneath the top plate, the illumination source configured to emit light having a strobe sequence; and
- a first housing optically coupled to the illumination source and extending above the surface, the housing located within the notch defined by the first edge of the top plate, the first housing including a lens arranged to direct the light emitted from the illumination source in a direction parallel to and above the scanning window and perpendicular to the scanner.

9. The barcode scanner of claim 8, further comprising a second housing optically coupled to the illumination source, wherein the surface further defines a second edge that intersects the first edge, the second housing source located at an intersection of the first edge and the second edge.

10. The barcode scanner of claim 8, wherein the notch is defined opposite a second scanning window such that the first housing is located opposite the second scanning window and directs light towards the second scanning window.

11. The barcode scanner of claim 8, wherein the strobe sequence ranges from about 60 Hz to about 250 Hz.

12. A service terminal comprising;
- a scale;
- a top plate located on top of a scale, the top plate defining a scanning window and a first edge that defines a notch proximate a center of the first edge;
- a scanner location proximate the scanning window;
- an illumination source extending above the surface and located within the notch defined by the first edge, the illumination source arranged to direct light in a direction parallel to and above the scanning window and perpendicular to the scanner, the light having a strobe sequence.

13. The service terminal of claim 12, further comprising a second scanning window, the illumination source located opposite the second scanning window.

* * * * *